(No Model.) 3 Sheets—Sheet 1.
H. B. MORRIS & L. A. BROTT.
MECHANICAL MUSICAL INSTRUMENT.
No. 252,844. Patented Jan. 24, 1882.
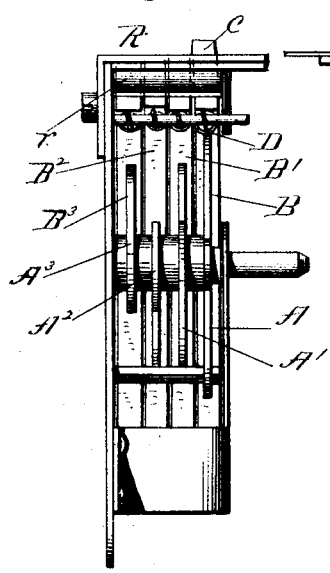
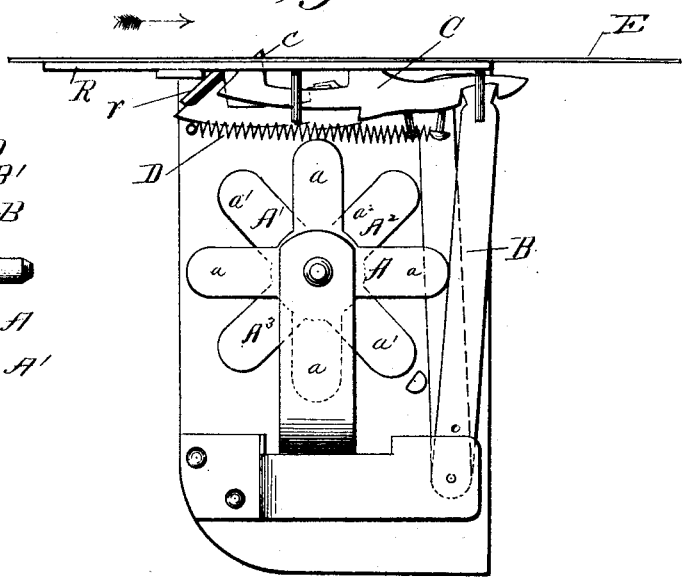
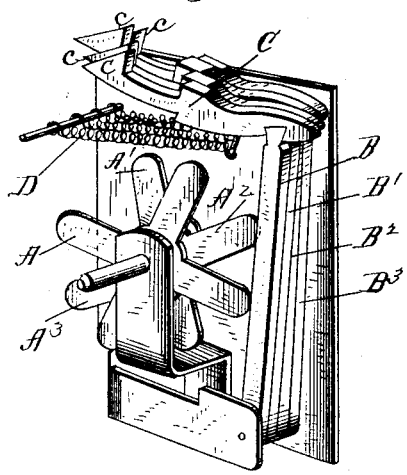
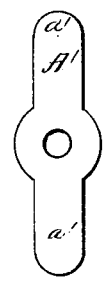
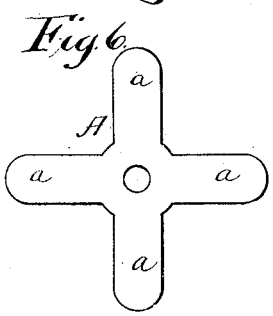
Witnesses
Franck L. Ourand
C. T. Ninn
Inventors
Henry B. Morris
Lucien A. Brott
by their Attorney (No Model.)  3 Sheets—Sheet 2.
H. B. MORRIS & L. A. BROTT
MECHANICAL MUSICAL INSTRUMENT.
No. 252,844.  Patented Jan. 24, 1882.
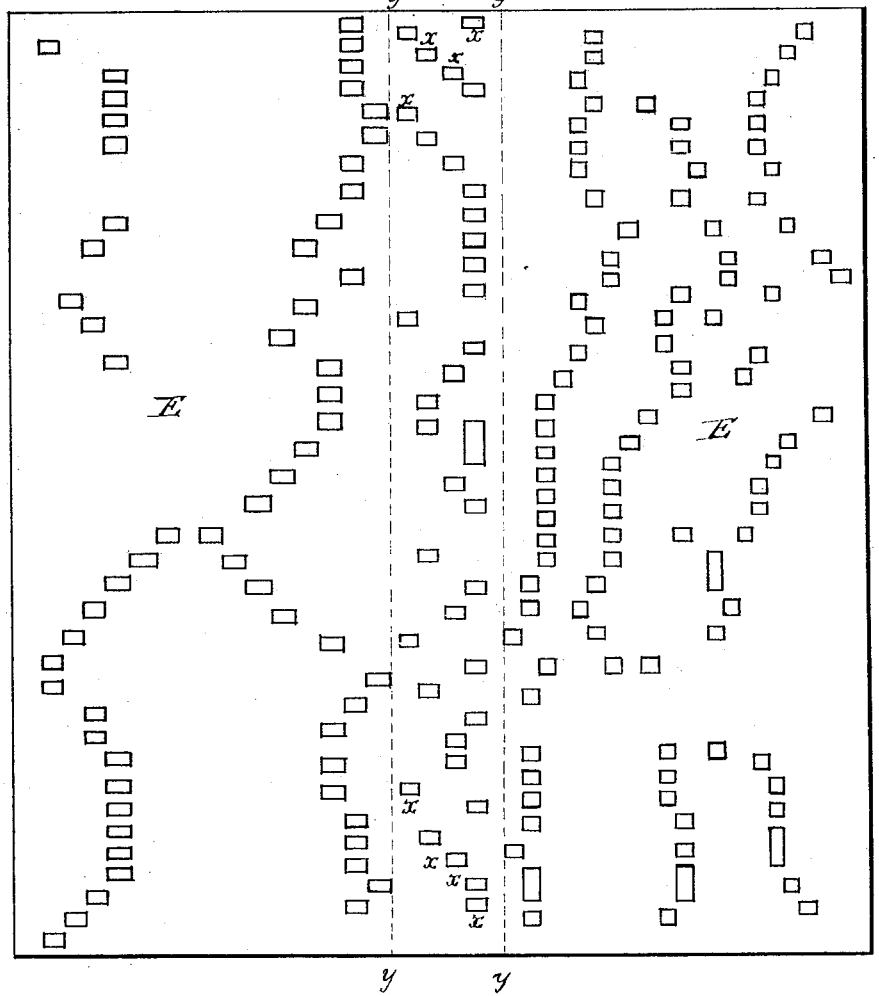

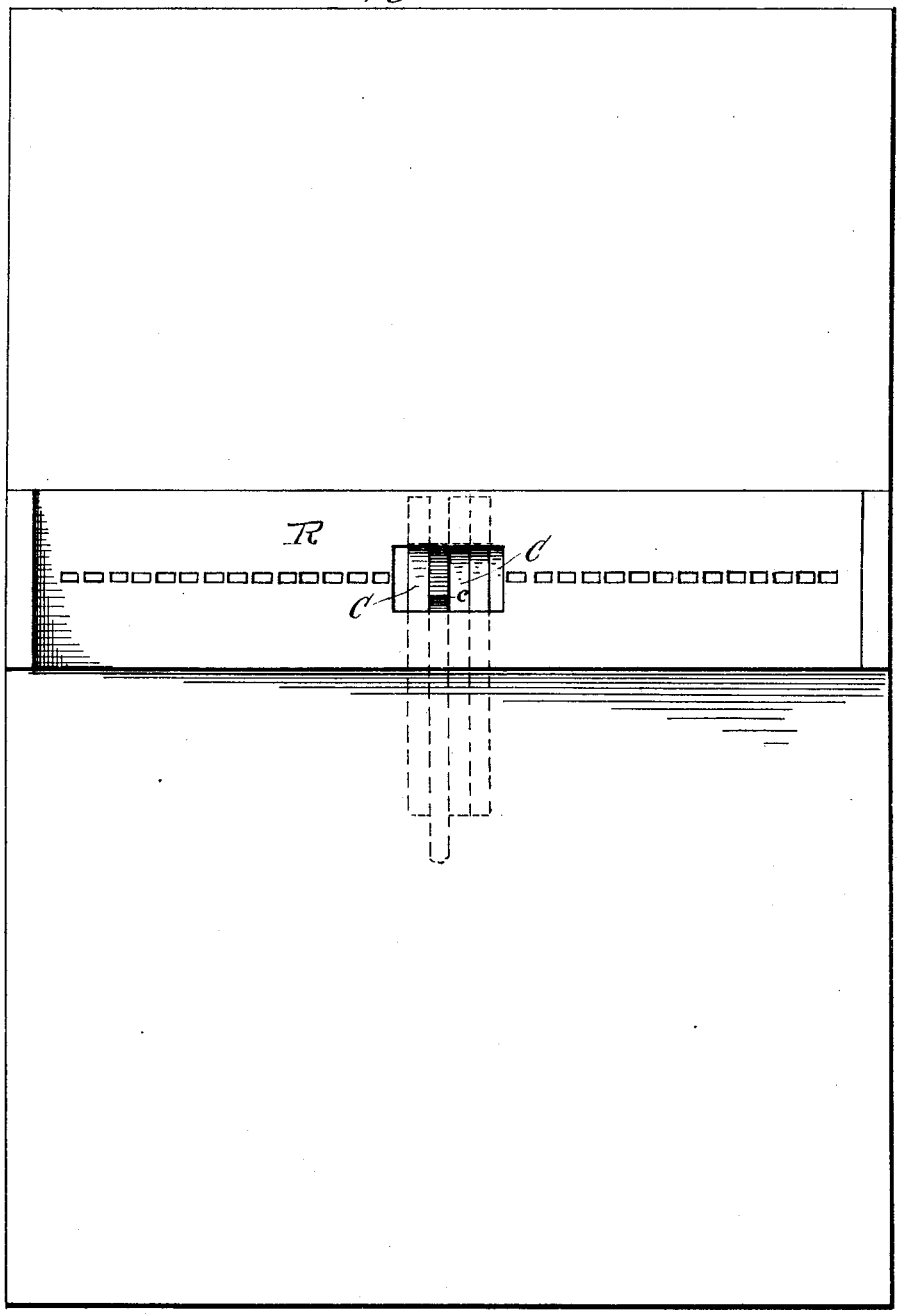

UNITED STATES PATENT OFFICE.

HENRY B. MORRIS AND LUCIEN A. BROTT, OF ITHACA, NEW YORK, ASSIGNORS TO THE AUTOPHONE COMPANY, OF SAME PLACE.

MECHANICAL MUSICAL INSTRUMENT.

SPECIFICATION forming part of Letters Patent No. 252,844, dated January 24, 1882.

Application filed September 19, 1881. (No model.)

*To all whom it may concern:*

Be it known that we, HENRY B. MORRIS and LUCIEN A. BROTT, citizens of the United States, residing at Ithaca, in the county of Tompkins and State of New York, have invented certain new and useful Improvements in Mechanical Musical Instruments; and we do hereby declare the following to be a full, clear, and exact description of the invention, such as will enable others skilled in the art to which it appertains to make and use the same.

This invention relates to that class of mechanical musical instruments which act in conjunction with a perforated music-sheet to produce a harmonious succession of sounds automatically.

The object of the invention is to construct a simpler and more perfect feeding mechanism for such instruments.

To this end the invention consists of a direct-acting differential-feed mechanism and of a specially designed music-sheet to be used in connection therewith.

Our invention is specially designed as an improvement on the feeding mechanism shown in the Patent No. 210,424, granted to H. B. Horton December 3, 1878. We have, however, made certain required changes in the organization of the instrument therein described to adapt our improvements to it. The music-sheet to be used with the instrument referred to in said patent is fed by means of two wheels keyed to a shaft, and provided with a like number of teeth which engage perforations near each edge of said sheet, the wheels and perforations acting after the manner of racks and pinions. The feeding-wheel shaft in the patented instrument is driven by means of pawls engaging with ratchet-wheels fixed on said shaft near one end, and changes in the rapidity of the feeding are made by means of levers adapted to throw the feeding-pawls into and out of engagement with their ratchets. The action of these levers is controlled by the music-sheet, which is to that end provided near one edge with perforations with which the levers engage.

We will now proceed to describe our invention in connection with the annexed drawings, wherein—

Figure 1 is a side elevation of the feeding mechanism. Fig. 2 is an end elevation thereof, looking from the front of the instrument. Fig. 3 is a perspective view. Figs. 4, 5, and 6 illustrate the cams removed from the shaft. Fig. 7 is a plan of our music-sheet. Fig. 8 is a plan of an instrument, showing the reed-board divided at its center by an aperture provided for the protrusion of the feed-hooks.

The same letters of reference are used in all the figures to designate like parts.

The principal change which we have made in the reorganization of the patented instrument is the division of the reed-plate, by reason of which change we are enabled to place our feed mechanism at the center of said instrument, and within the inclosing case or frame thereof, thus protecting such feeding mechanism from dust and from injury that might be caused by contact with other objects, also effecting an economy in space and in the number of operating parts, as we do away with the feeding-pinions at each side of the instrument, the feeding-ratchets at one side thereof, and the transverse shaft above the reed-board on which such pinions and ratchets were mounted.

Fixed side by side on a shaft having a steady rotary motion—the balance-wheel shaft, for instance—are four cams, A, A', A², and A³, the cam A having four leaves, $a$; the cam A' having two leaves, $a'$; and the cams A² and A³ having one leaf each.

Mounted side by side on a fixed stud are four rock-levers, B, B', B², and B³, arranged one opposite each cam, and connected to the upper end of each lever is a reciprocating pawl, C. These pawls are at their free ends beveled at the upper side and provided with hooks $c$, which point upwardly and are adapted to project through an aperture cut at the center of the reed-board R, upon their forward or feeding movement. To the under side of each of these pawls is secured one end of a coiled spring, D, the other ends of which are secured to some fixed part of the instrument, the springs being parallel (in a vertical plane) with their respective pawls, as shown, so that they will exert their force in drawing said pawls and their respective rock-levers toward the front of the instrument. These springs, being attached to the under side of the pawls, also tend to throw the free ends of said pawls upward, so that the hooks $c$ will project through the aperture formed in the reed-board. The pawls, when drawn to the utmost limit of their movement toward the front of the instrument, will be depressed sufficiently by contact with the inclined plate $r$, secured to the under side of the reed-board at the front side of its aperture, to withdraw their hooks $c$ from said aperture. This inclined plate $r$ also serves to render the ascent of the hooks into the aperture of the reed-board gradual, thus preventing the tearing of the music-sheet by the hooks suddenly springing against it.

The leaves of each cam are so arranged with relation to the leaves of the other cams that no two of the pawls can be on the forward or feeding stroke at the same time; but the pawls will collectively make eight distinct forward strokes at each revolution of the shaft on which the cams are mounted.

The music-sheet E, to be used with instruments in which our improvements are embodied, differs from those in ordinary use, in that instead of having a row of equidistant perforations near each edge for the reception of the teeth of the driving-pinions, it is provided at the center with a row, $x$, (one or more, four being shown in this instance,) of perforations for the reception of the hook or hooks of the feeding pawl or pawls. These feeding-perforations may be so placed and spaced as to cause the instrument to sound from one to eight notes in a measure—that is, it may sound an eighth, quarter, half, or full note. A row of apertures above a pawl actuated by a one-leaf cam will cause the music-sheet to feed for one full note at each revolution of the cam-shaft. A similar row above a pawl, actuated by the two-leaf cam, will in like manner produce a half-note. Sheets representing music which is to be played in rapid time (eight beats to the measure) will be provided with four rows of such feeding-apertures, one above each feeding-pawl. In the event of a pawl coming into action when there is no aperture in the music-sheet for its reception, said pawl will, while making its forward stroke, be kept down by the pressure of said sheet. The music-sheet is fed upon the reed-board in the direction indicated by the arrow, Fig. 1.

Many variations of our improved feeding device will naturally suggest themselves to those skilled in the art upon a perusal of the foregoing description. As, for instance, the rock-levers might be dispensed with, and the pawls be operated directly by the cams; or we might dispense with both the rock-levers and pawls, and depend solely upon the cams for feeding the music-sheet, such changes being first made in the form of said cams as to adapt them for this purpose. Again, a short cylinder might be mounted to turn beneath the aperture in the reed-board, said cylinder being provided with spring-arms adapted to engage with the perforations in the music-sheet. Any of these or similar changes we would consider as but modifications of the device hereinbefore described.

The feed-holes $x$ of the music-sheet are shown as similar to the note-holes thereof. Hence to distinguish them more clearly we have drawn two broken lines, $y\ y$, between the feed-holes and the note-holes on each side thereof.

Having thus described our invention, what we claim is—

1. In combination with a music-sheet, a differential-feeding mechanism for mechanical musical instruments, the same consisting of a series of feeding hooks or arms arranged in different planes, and constructed to operate directly upon said music sheet, substantially as before set forth.

2. A differential-feeding mechanism for mechanical musical instruments, mounted at the transverse center of such instrument, substantially as before set forth.

3. The combination, substantially as before set forth, of the cams mounted side by side on a single shaft, the rock-levers, one opposite each cam, and operated thereby, the pawls secured one to each rock-lever and the springs.

4. The combination, substantially as before set forth, of the feeding-pawls provided with springs, the cams (one for each pawl) for moving the pawls one at a time in one direction, and the music-sheet provided at its center with feed-holes.

5. The combination, substantially as before set forth, of the feeding-pawls, provided with springs, the cams (one for each pawl) for moving the pawls one at a time in one direction, and the music-sheet provided at its center with two or more rows of feed-holes.

6. A perforated music-sheet having a series of longitudinal rows of feed-holes along the center of the sheet, arranged as described, and having note-holes on each side thereof, substantially as before set forth.

In testimony whereof we affix our signatures in presence of two witnesses.

HENRY B. MORRIS.
LUCIEN A. BROTT.

Witnesses:
  B. E. J. EILS,
  WM. J. TOTTEN.